United States Patent [19]

Inskeep, Jr.

[11] Patent Number: 4,802,990

[45] Date of Patent: Feb. 7, 1989

[54] SOLUTION AND METHOD FOR DISSOLVING MINERALS

[76] Inventor: Eugene L. Inskeep, Jr., 20320-14th Ave. W., Lynnwood, Wash. 98036

[21] Appl. No.: 79,810

[22] Filed: Jul. 30, 1987

[51] Int. Cl.[4] .............................................. C02F 5/14
[52] U.S. Cl. ................... 210/699; 210/701; 134/3; 134/22.19; 134/41; 252/82; 252/87; 252/180; 252/181
[58] Field of Search ............... 210/698–701; 252/180, 181, 82, 87; 260/502.4 R, 502.4 P, 502.4 E; 134/3, 22.19, 41

[56] References Cited

U.S. PATENT DOCUMENTS

| | | | |
|---|---|---|---|
| 3,085,975 | 4/1963 | Jennings | 210/698 |
| 3,149,151 | 9/1964 | Schiefer et al. | 260/502 |
| 3,150,081 | 9/1964 | Haslam | 210/698 |
| 3,214,454 | 10/1965 | Blaser et al. | 260/429.9 |
| 3,317,340 | 5/1967 | Ziehr et al. | 117f/53 |
| 3,527,609 | 9/1970 | Vinso | 210/698 |
| 3,904,493 | 9/1975 | Losi et al. | 260/502.4 R |
| 4,209,398 | 6/1980 | Ii et al. | 422/17 |
| 4,216,163 | 8/1980 | Sommer et al. | 210/700 |
| 4,246,103 | 1/1981 | Block et al. | 210/699 |
| 4,561,982 | 12/1985 | Kuriyama et al. | 210/698 |
| 4,584,104 | 4/1986 | Dubin | 210/699 |
| 4,642,194 | 2/1987 | Johnson | 210/700 |
| 4,663,053 | 5/1987 | Geiger | 210/699 |

*Primary Examiner*—Peter Hruskoci
*Attorney, Agent, or Firm*—Delbert J. Barnard

[57] ABSTRACT

A method of dissolving mineral salts comprising contacting the mineral salts with a solution of water, an additive consisting essentially of six moles of 1-hydroxyethane, 1,1-diphosphonic acid mixed with one mole of hydroxymethylene phosphonic acid, phosphonoformic acid, sulfamic acid, oxalic acid, hydroxyacetic acid, 2-amino ethane sulfonic acid, or fluoroboric acid and neutralized to a pH of 7.0, and a polymeric dispersant.

8 Claims, No Drawings

SOLUTION AND METHOD FOR DISSOLVING MINERALS

TECHNICAL FIELD

The present invention relates to methods and chemical solutions for dissolving minerals. The invention has particular application as a scale remover in water systems and the like.

BACKGROUND ART

U.S. Pat. No. 4,561,982, granted Dec. 31, 1985 to Yasuhia Kurikama and Syoichiro Kajiwara discusses scale problems in cooling water systems, boiler water systems, etc. and other situations which require the use of an effective chemical for dissolving scale, or preventing its formation, or for dissolving various minerals in different environments.

The substance 1-hydroxyethane 1, 1-diphosphonic acid (commonly termed HEDPA) has been in commercial use for many years for preventing or removing mineral deposits in heat exchanging equipment such as cooling towers and boilers. HEDPA acts as a sequestrant when used in quantities below 30 parts HEDPA to one million parts water. Above 150 parts HEDPA to one million parts water it acts as a chelate. In the range 30-150 parts HEDPA for one million parts water there is a dead zone; the HEDPA does not perform. It is known that HEDPA combined with a polymeric dispersant produces a synergistic result. The polymeric not only functions as a dispersant but also improves the mineral dissolving performance of the HEDPA when the HEDPA is used in a strength above 150 ppm in water.

DESCRIPTION OF THE INVENTION AND BEST MODE OF OPERATION

The present invention relates to the provision of an improved mineral dissolving solution which is a blend of HEDPA and a second substance. The blend of the invention does not sequest and there is no dead or non-performance zone. It acts as a chelate throughout a large concentration range, starting with a few parts per million in water. Good results can be obtained when the blend is used in a strength of 5-10 parts per million. A larger amount of the blend produces faster results.

Another advantage of the blend of the present invention is that a polymeric dispersant has a greater enhancing effect on the mineral dissolving performance of the blend than it does when used with HEDPA alone.

HEDPA is an alkyl diphosphonate. A commercially available form of HEDPA is termed 1-hydroxyethane 1, 1-diphosphonic acid and has the following structure:

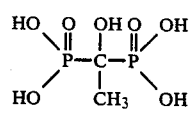

Herein HEDPA is used to describe a number of behave-alike alkyl diphosphonates of the basic structure:

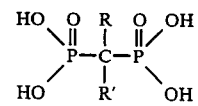

The following is a list of known HEDPA variants and their structures which indicates what constituents may be represented by -R and R':

| Structure | Name |
|---|---|
| R=H, R'=H | methylene diphosphonic acid (MDP) |
| R=OH, R'=H | hydroxymethylene diphosphonic acid (HMDP) |
| R=Cl, R'=Cl | dichloromethylene diphosphonic acid (Cl$_2$MDP) |
| R=OH, R'=cyclohexyl | hydroxycyclohexylmethylene diphosphonic acid (HCMDP) |
| R=OH, R'=CH$_3$ | 1-hydroxyethylidene diphosphonic acid (HEDPA) |
| R=OH, R'=CH$_2$—CH$_2$—NH$_2$ | 1-hydroxy-3aminopropane 1,1-diphosphonic acid (APD) |

In accordance with the invention, six moles of HEDPA are mixed with one mole of one of the following: hydroxy methylene phosphonic acid, phosphono formic acid, sulfamic acid, oxalic acid, hydroxy acetic acid, 2-amino ethane sulfonic acid, or fluoro boric acid. The mixture or blend is neutralized to a pH of 7.0, such as by the addition of potassium hydroxide or ammonia. It is then added to water in the strength required. Preferably a polymeric dispersant is admixed with the blend to both keep it from reprecipitating and to enhance the scale dissolving ability of the blend.

The following is a list of blends prepared for the purpose of conducting tests:

| 1 liter quantities | Gram Molecular Weight | Solute Amount (Moles) | Solute Amount (Grams) |
|---|---|---|---|
| (1) | | | |
| 1-hydroxy ethanediphosphonic acid | 206 | 0.690 | 142.14 |
| hydroxy methylenephosphonic acid | 112 | 0.115 | 12.88 |
| potassium hydroxide to pH = 7.0 | | | |
| water to 1 liter | | | |
| (2) | | | |
| 1-hydroxy ethanediphosphonic acid | 206 | 0.690 | 142.14 |
| phosphono formic acid | 128 | 0.115 | 14.72 |
| potassium hydroxide to pH = 7.0 | | | |
| water to 1 liter | | | |

-continued

| 1 liter quantities | Gram Molecular Weight | Solute Amount (Moles) | Solute Amount (Grams) |
|---|---|---|---|
| (3) | | | |
| 1-hydroxy ethanediphosphonic acid | 206 | 0.690 | 142.14 |
| oxalic acid | 90 | 0.115 | 10.35 |
| potassium hydroxide to pH = 7.0 | | | |
| water to 1 liter | | | |
| (4) | | | |
| 1-hydroxy ethanediphosphonic acid | 206 | 0.690 | 142.14 |
| sulfamic acid | 97 | 0.115 | 11.16 |
| potassium hydroxide to pH = 7.0 | | | |
| water to 1 liter | | | |
| (5) | | | |
| 1-hydroxy ethanediphosphonic acid | 206 | 0.690 | 142.14 |
| hydroxy acetic acid | 76 | 0.115 | 8.74 |
| potassium hydroxide to pH = 7.0 | | | |
| water to 1 liter | | | |
| (6) | | | |
| 1-hydroxy ethanediphosphonic acid | 206 | 0.690 | 142.14 |
| fluoro boric acid | 87.8 | 0.115 | 10.10 |
| potassium hydroxide to pH = 7.0 | | | |
| water to 1 liter | | | |
| (7) | | | |
| 1-hydroxy ethanediphosphonic acid | 206 | 0.690 | 142.14 |
| 2-amino ethane sulfonic acid | 14.5 | 0.115 | 126.0 |
| potassium hydroxide to pH = 7.0 | | | |
| water to 1 liter | | | |

EXAMPLE I

A separate test tube was prepared for each of the above listed blends. A 0.2 gram of mineral deposit with a high proportion of calcite was placed in each test tube. Each test tube received a 5 milliliter sample of a different one of the blends. 0.2 grams of the same mineral deposit and five milliliters of HEDP alone were placed in an eighth test tube. The samples were allowed to stand for thirty days. The performance of the blends was then compared with the performance of the HEDP alone. In some cases a gell was formed. In some cases there was a reprecipation of a soft highly hydrated material. Each blend dissolved the mineral much better than HEDP alone.

EXAMPLE II

The procedure described above in Example I was repeated except that a 0.2 gram sample of the mineral olivine was used in each test tube. The results were very similar to the results obtained in the first example. The different blends showed varying abilities to change the hard mineral crystal into a soft hydrated substance. Table I below is an analyses of the olivine that was used.

TABLE I

Below are listed the results of an ore sample using plasma spectrometer analyses.
All values are in percent.

| Element | Sample B | Sample A | Element | Sample B | Sample A |
|---|---|---|---|---|---|
| Silver | 0.0025 | 0.0025 | Niobium | 0.0001 | 0.0001 |
| Aluminum | 0.22 | 0.18 | Neodymium | 0.0001 | 0.0001 |
| Arsenic | 0.0083 | 0.024 | Nickle | 0.16 | 0.14 |
| Gold | 0.0001 | 0.0001 | Phosphorous | 0.0057 | 0.0096 |
| Boron | 0.0001 | 0.0001 | Lead | 0.0020 | 0.0033 |
| Barium | 0.022 | 0.0056 | Palladium | 0.0001 | 0.0001 |
| Beryllium | 0.0001 | 0.0001 | Platinum | 0.0026 | 0.0003 |
| Bismuth | 0.0001 | 0.0001 | Rubidium | 0.0001 | 0.0001 |
| Calcium | 0.28 | 0.071 | Rhodium | 0.0001 | 0.0001 |
| Cadmium | 0.0008 | 0.0024 | Antimony | 0.0001 | 0.0001 |
| Cerium | 0.0001 | 0.0001 | Scandium | 0.0001 | 0.0001 |
| Colbalt | 0.0070 | 0.0094 | Silicon, soluble* | 0.0076 | 0.0052 |
| Chromium | 0.082 | 0.081 | Tin | 0.0001 | 0.0001 |
| Copper | 0.0025 | 0.0012 | Strontium | 0.0041 | 0.0011 |
| Iron | 4.87 | 14.45 | Thorium | 0.0001 | 0.0001 |
| Germanium | 0.0001 | 0.0001 | Titanium | 0.0016 | 0.0016 |
| Potassium | 0.0030 | 0.0001 | Uranium | 0.0001 | 0.0001 |
| Lanthanum | 0.0001 | 0.0001 | Vanadium | 0.0016 | 0.0008 |
| Lithium | 0.0001 | 0.0001 | Tungsten | 0.0001 | 0.0001 |
| Magnesium | 18.21 | 14.95 | Yttrium | 0.0001 | 0.0001 |
| Manganese | 0.057 | 0.055 | Zinc | 0.0053 | 0.0050 |
| Molybdenum | 0.0001 | 0.0001 | Zirconium | 0.0022 | 0.0063 |
| Sodium | 0.0030 | 0.0023 | | | |

*Soluble Silicon - only that material which dissolves in aqua regia.

EXAMPLE III

The test procedure was gain repeated, using 0.2 grams of magnesium amnonium phosphate and 100 milliliter samples of the blends. Observations showed that the blends completely dissolved the mineral.

EXAMPLE IV

Following the test tube tests, I treated a cooling tower that was heavily scaled with a calcite mineral deposit. I combined together 1-hydroxyethylidene diphosphonic acid (HEDP) and hydroxy methylenephosphonic acid (HMP) in the proportion six moles HEDP to one mole HMP. This blend was added to water and the resulting solution was pumped through a portion of the cooling tower. The result was a complete and relatively fast acting dissolution of the calcite and a reprecipitation of the material. The material had the appearance of a soft gelatinous "mud" which settled in an accessible zone of low turbulence and was removed by unprotected hands from the equipment. The starting pH of the blend was 7.0±0.5. The material that was removed had pH levels of 9.8±0.5.

The above-described procedure was repeated in a second portion of the cooling tower, but this time the water additive used was composed of 1-hydroxyethylidene diphosphonic acid (HEDP) and phosphono formic acid (PF), also referred to as "phosphonoformate." Again, the proportions were six moles HEDP to one mole PF. The mixture was neutralized to a starting pH of 7.0 by the addition of potassium hydroxide. The same results were obtained by the use of this mixture. There was a complete and relatively fast dissolution of the mineral. A soft gelatinous "mud" was produced. This mud was removed by unprotected hands from the equipment.

The cooling tower had been treated with hydrochloric acid from previous years and the galvanizing on the tops of the top row of heat exchanger tubes was dissolved in small patches, exposing ferrous alloy. Use of the tower following the cleaning by use of hydrochloric acid caused a layer of calcite to form over the patches. The patch areas were examined following completion of the above test. The examination revealed a removal of the calcite layer but no increase in size of the patches.

The pump used for circulating the solvent through the cooling tower was a used pump. Its bronze impeller was heavily coated with oxides of copper. The pump was examined following the test. The impeller showed no excessive errosion although the black oxide coating was removed, leaving a dull unpitted finish. The use of hydrochloric acid for the descaling would have completely destroyed the impeller.

The conclusions made from the tests are that (1) calcite deposits can be removed from cooling towers without the hazards normally encountered when hydrochloric acid or other mineral acids are used and (2) the process can be performed without modification to the mechanical system.

EXAMPLE V

Tests were then conducted to determine the effectiveness of the blends as scale inhibitors. Tests were conducted for the inhibition of calcium carbonate precipitation. For each blend, ten milliliters of a 14.7 g/l solution of calcium chloride dihydrate was placed in a beaker and then the blend was added. Several beakers were prepared for each blend, each with a different strength amount of the blend. Next, ten milliliters of sodium bicarbonate, NaHCO(3), was added. The total volume was brought to 100 milliliters by the addition of deionized water. The resulting 100 milliliter solution of ten milli moles calcium carbonate was examined for five days. The examination showed that when the blend was added at 0.28 milli moles (one mole of blend per 36 moles of carbonate) or greater the samples initially were transparent. When the samples were run at levels below 0.28 moles of the blend, the calcium precipitated more rapidly than if no blend were added. Over the five days of observation the samples formed a soft precipitate of loosely adherent particles which were much softer than calcites. The conclusions made from these tests were that at levels above 0.28 milli moles the blend would inhibit precipitation for eight to ten hours. However, a more important finding was that the final precipitate was soft and easily dispersed with a small quantity of a polymeric dispersant.

There are several types of polymeric dispersants available. Readily available and relatively inexpensive dispersants include polyacrylic acid or its water-soluble salts, or hydrolized polymaleic anhydride or its water-soluble salts.

What is claimed is:

1. A method of dissolving mineral salts in water systems comprising contacting the mineral salts with an effective amount of a solution consisting essentially of water and six moles per liter of 1-hydroxyethane 1, 1-diphosphonic acid mixed with one mole per liter of hydroxy methylene phosphonic acid and neutralized to a pH of 7.0 with potassium hydroxide or ammonia.

2. A method of dissolving mineral salts in water systems comprising contacting the mineral salts with an effective amount of a solution consisting essentially of water and six moles per liter of 1-hydroxyethane 1, 1-diphosphonic acid mixed with one mole per liter of phosphono formic acid and neutralized to a pH of 7.0 with potassium hydroxide or ammonia.

3. A method of dissolving mineral salts in water systems comprising contacting the mineral salts with an effective amount of a solution consisting essentially of water and six moles per liter of 1-hydroxyethane 1, 1-diphosphonic acid mixed with one mole per liter of oxalic acid and neutralized to a pH of 7.0 with potassium hydroxide or ammonia.

4. A method of dissolving mineral salts in water systems comprising contacting the mineral salts with an effective amount of a solution consisting essentially of water and six moles per liter of 1-hydroxyethane 1, 1-diphosphonic acid mixed with one mole per liter of sulfamic acid and neutralized to a pH of 7.0 with potassium hydroxide or ammonia.

5. A method of dissolving mineral salts in water systems comprising contacting the mineral salts with an effective amount of a solution consisting essentially of water and six moles per liter of 1-hydroxyethane 1, 1-diphosphonic acid mixed with one mole per liter of hydroxy acetic acid and neutralized to a pH of 7.0 with potassium hydroxide or ammonia.

6. A method of dissolving mineral salts in water systems comprising contacting the mineral salts with an effective amount of a solution consisting essentially of water and six moles per liter of 1-hydroxyethane 1, 1-diphosphonic acid mixed with one mole per liter of 2-amino ethane sulfonic acid and neutralized to a pH of 7.0 with potassium hydroxide or ammonia.

7. A method of dissolving mineral in salt water systems comprising contacting the mineral salts with an effective amount of a solution consisting essentially of water and six moles per liter of 1-hydroxyethane 1, 1-diphosphonic acid mixed with one mole per liter of fluoro boric acid and neutralized to a pH of 7.0 with potassium hydroxide or ammonia.

8. A method of dissolving mineral salts in water systems comprising contacting the mineral salts with an effective amount of a solution consisting essentially of water and six moles per liter of 1-hydroxyethane, 1, 1-diphosphonic acid mixed with one mole per liter of hydroxymethylene phosphonic acid, phosphonoformic acid, sulfamic acid, oxalic acid, hydroxyacetic acid, 2-amino ethane sulfonic acid, or fluoroboric acid and neutralized to a pH of 7.0 with potassium hydroxide or ammonia, and a polymeric dispersant.

* * * * *